July 14, 1970
L. LICHT
3,520,578
JOURNAL BEARING
Filed Dec. 5, 1968
3 Sheets-Sheet 2
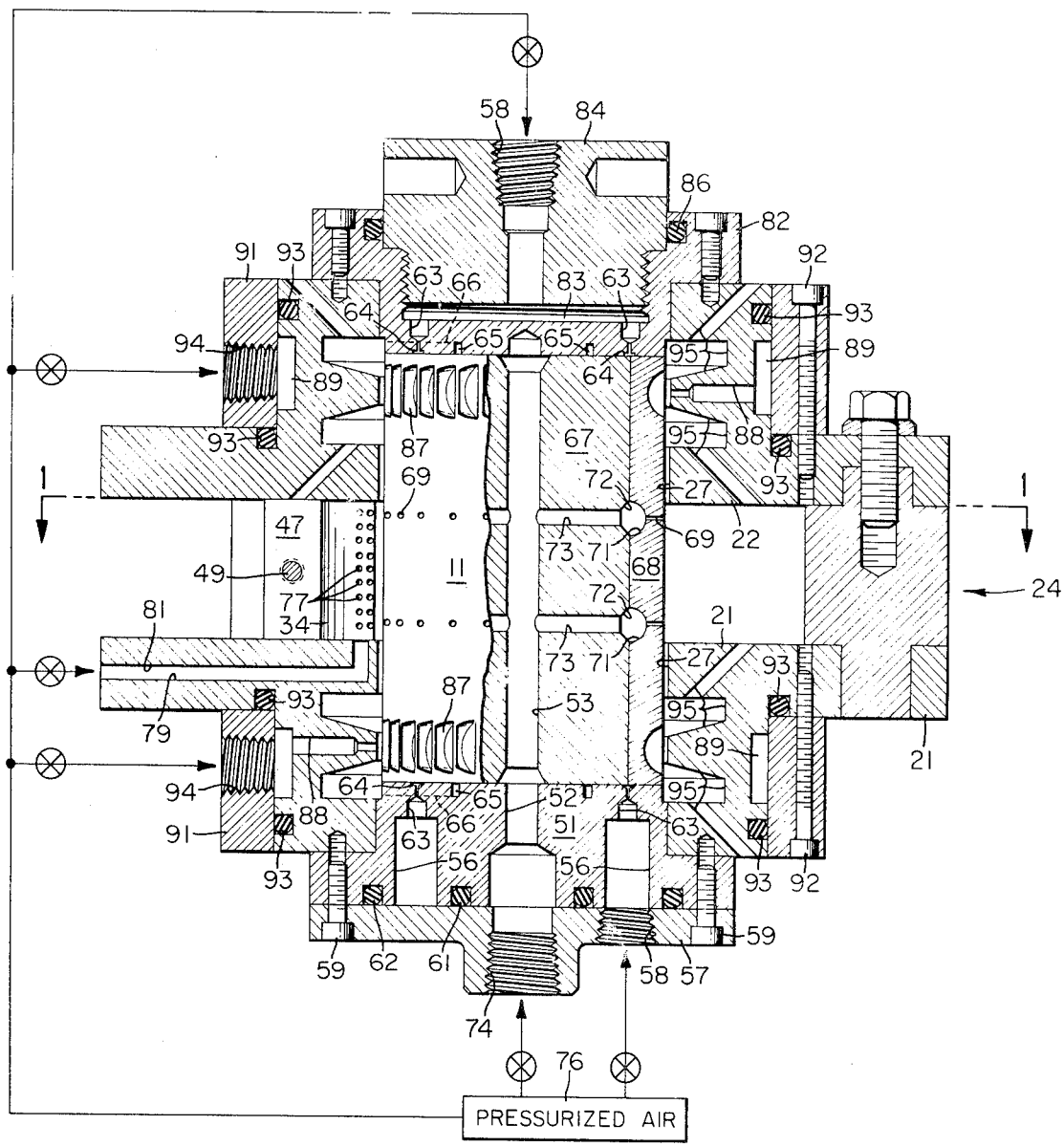
FIG_2
INVENTOR.
LAZAR LICHT
BY
Robert H. Clay
ATTORNEY July 14, 1970          L. LICHT          3,520,578
JOURNAL BEARING
Filed Dec. 5, 1968          3 Sheets-Sheet 3
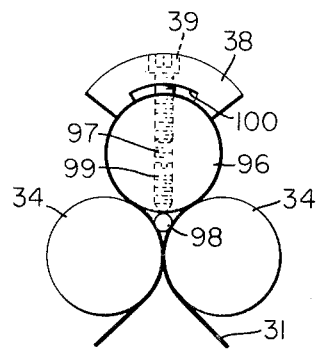
FIG_4
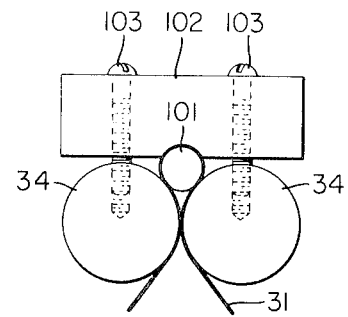
FIG_5
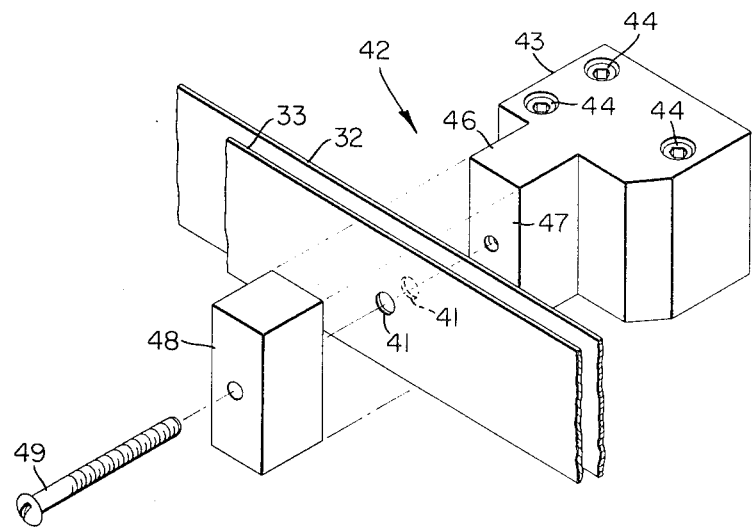
FIG_3
INVENTOR.
LAZAR LICHT
BY Robert H. Clay
ATTORNEY United States Patent Office 3,520,578
Patented July 14, 1970

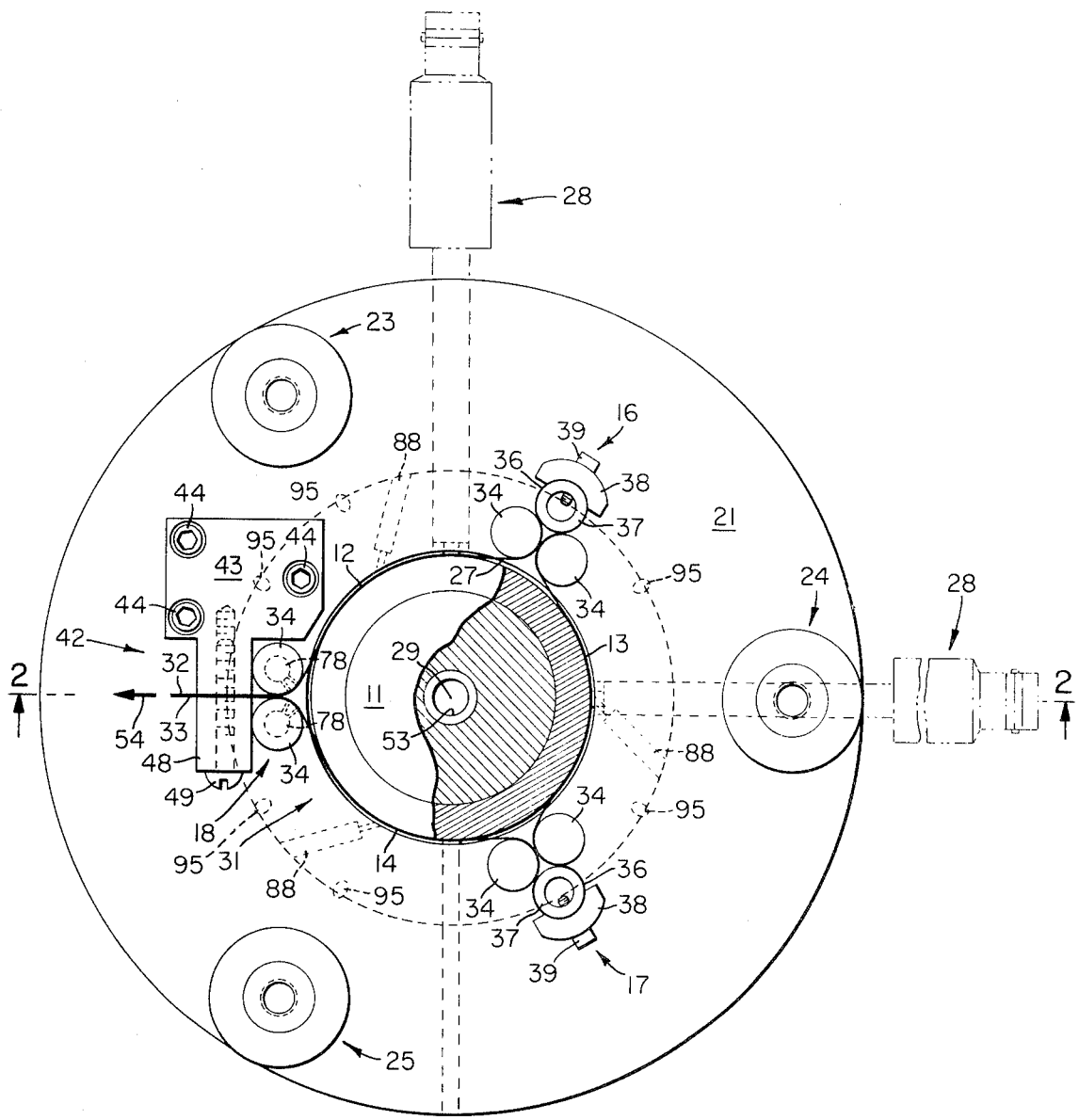
FIG_1
INVENTOR.
LAZAR LICHT
BY
Robert D. Clay
ATTORNEY

3,520,578
JOURNAL BEARING
Lazar Licht, San Mateo, Calif., assignor to Ampex Corporation, Redwood City, Calif., a corporation of California
Filed Dec. 5, 1968, Ser. No. 781,436
Int. Cl. F16c 17/16
U.S. Cl. 308—9                  13 Claims

ABSTRACT OF THE DISCLOSURE

A turbine driven rotor is supported radially by flexible foil-bearings and constrained axially by an externally-pressurized, bidirectional thrust bearing. The foil is secured at three stations around the periphery of the journal to define three rotor-supporting foil segments. The foil is securely anchored at two stations and tension is applied to the free ends of the foil at the third station by means of weights. The foil is separated from the journal and from two foil-guides at the third station by external pressurization, in order to eliminate friction in the process of tension equalization and rotor centering. When tension has been applied, the foil is locked at the third station. The external pressurization is also provided at the journal above for augmenting the self-acting film at low rotational speeds, as during starting and stopping of the rotor.

---

The invention described herein was made in the performance of work under a NASA contract and is subject to the provisions of Section 305 of the National Aeronautics and Space Act of 1958, Public Law 85–568 (72 stat. 435; 42 USC 2457).

BACKGROUND OF THE INVENTION

The invention is related to fluid-film journal bearings, and particularly to self-acting and externally-pressurized types of gas-lubricated foil bearings.

Journal bearings, consisting of flexible metal foils, wrapped in three equi-spaced zones around the journal of a rotating shaft and supporting the shaft on self-acting air films, have recently been constructed and have been demonstrated to be free from "fractional-frequency whirl," a type of instability that either limits the operational speed or leads to the destruction of rigid-surface, fluid-film bearings, if the limiting speed is exceeded.

Besides this very great advance in the art, a number of other advantages inhere in the foil bearing. Of particular relevance to the present invention is that excursions of the journal center are not limited by the narrow confines of the clearance of a rigid bearing, but can exceed the latter by an order of magnitude, without decreasing the thickness of the lubricating film beyond a tolerable limit. The flexibility of the foil produces also excellent self-alignment characteristics of the bearing, a tolerance of foreign particles and superior wipe-wear properties. Furthermore, the foil bearing imposes no stringent requirements on the dimensional tolerances and the roundness of the journal. Since the foil conforms and complies, it is not only for giving of dimensional imperfections, but it can also accommodate appreciable thermal distortions of the journal, as well as "growth" due to centrifugal effects at high rotational speeds.

Rotors excited at frequency equal to half the rotational speed display dangerously large amplitudes of motion when supported in conventional fluid-film rigid bearings. Experiments have shown that excitation at frequencies equal to one half the rotational frequency of the rotor has no adverse effect on foil bearing performance.

The contact between a journal and a rigid bearing is a very dangerous and destructive event. Stresses along a "line of contact," due to impact for example, can result in complete bearing failure. Contact between a journal and a flexible foil takes place at a multiplicity of points, distributed over the entire region of wrap. The stress is well distributed, the impact is cushioned and burnishing of asperities, rather than galling, ploughing and scoring takes place.

In the setting-up of the foil bearings for precision application, it becomes of great importance to establish a know and predetermined value of tension in the foil, since the preload tension determines the magnitude of the separation between the journal and the foil under operating conditions.

Another problem associated with previous (self-acting) foil journal bearings is that of starting the rotor and getting it up to the minimum speed at which the self-acting air films become thick enough to fully lubricate the bearing. The problem is also present when the rotor is stopped. The initial starting and ultimate stopping of the rotor in contact with the foils may cause frictional wear, burnishing and sometimes scoring of both foil and rotor. While this effect is not severe and may be tolerable in some applications, it is nonetheless undesirable in that the life of both elements may be shortened by such contact.

It is therefore an object of the present invention to produce a foil journal bearing adapted for the establishment of a known and predetermined tension in the foil while maintaining the rotor element centered at a desired and predetermined location.

It is another object of the invention to produce a foil journal bearing in which the rotor element is not in direct frictional contact with the foils during starting and stopping of the rotor.

FIG. 1 is a cross sectional view taken along the plane of lines 1—1 of FIG. 2;
FIG. 2 is a cross sectional view taken along the plane of lines 2—2 of FIG. 2;
FIG. 3 is an exploded view to an enlarged scale of a portion of the apparatus shown in FIGS. 1 and 2;
FIG. 4 is a view to an enlarged scale of a variational form of a portion of the apparatus of FIG. 1; and
FIG. 5 is an exploded view to an enlarged scale of a portion of the apparatus shown in FIGS. 1 and 2.

SUMMARY OF THE INVENTION

The above and and other objects are accomplished in the present invention by means of a structure in which a rotor, driven by a turbine, electric motor, or other means, has journals supported in flexible foil-bearings, externally-pressurized and self-acting, the structure consisting of a single foil strip that is anchored at three equi-spaced stations, to define three rotor-supporting foil segments, which constitute a flexible journal-bearing. At two of these stations the foil is securely anchored, and at the third station tension is applied to the two ends of the foil strip by known weights, until the tension in all foil segments is equalized and the rotor is sensibly centered, whereupon the foil is also secured by clamping at the third station, adjacent to the ends of the foil strip.

External pressurization through the interior of the rotor is used to separate the foil from the surface of the rotor and from the surface of two guide posts at the third station, in order to eliminate friction and to permit equalization of tension in the three regions of wrap, in the course of which the rotor is also sensibly centered by three equipollent forces. Pressurization through the interior of the rotor, from an external pressure source, is also used to lift the preloaded foils from the surface of the journal and to augment the lubricating film during starting, stopping and slow rotation, until adequate support can be generated by a self-acting, hydrodynamically induced fluid-film.

DESCRIPTION OF THE PREFERRED EMBODIMENTS

Referring now to FIG. 1 of the drawing, there is shown a journal bearing construction with a turbine driven rotor 11 which is supported between three foil segments 12, 13 and 14 equally spaced at 120°, and the ends of which are anchored by three foil anchoring assemblies 16, 17, 18 equi-spaced around the rotor. The assemblies 16, 17, 18 are solidly mounted between a pair of mounting plates 21 and 22 (see also FIG. 2), which are spaced apart in the axial direction of the rotor as by means of three spacing elements 23, 24, 25. The mounting plates each have a clearance opening 27 centrally formed therein and of substantially greater diameter than the rotor for extension of the ends of the rotor through the plates.

The particular apparatus illustrated in this embodiment is intended for measuring displacements and radial excursions of the rotor under various shock, vibration and load conditions, as by means of a number of capacitance probes 28 which may be inserted through openings (not shown) in the mounting plates 21 and 22 with the tips of the probes very precisely spaced at a predetermined radial distance from a predetermined position 29 of the axis of rotation of the rotor. It will be understood, therefore, that in setting up the apparatus for operation, it is of the greatest importance to establish a known and predetermined value of tension in the foil, while maintaining the axis of the rotor precisely centered at the position 29.

For the purpose of performing this precise tensioning adjustment, the apparatus is constructed as follows. The foil segments 12–14 are formed as integral portions of a single foil strip 31, which is coupled solidly to two of the anchoring assemblies 16 and 17; and the end portions 32 and 33 of the foil strip 31 are passed slidably through the third anchoring assembly 18 for tensioning as with known weights.

The construction of the anchoring assemblies is as follows. Each of them has a pair of rounded first posts 34 in axial parallelism with the rotor when the latter is in its correct position centered on the axis 29. The posts 34 are tangent to one another, though not quite touching, along a radial plane of the rotor, and the foil member 31 passes in doubled manner between the posts 34 so as to define a loop portion 36 that is looped around a second post 37. The post 37 is parallel to the posts 34 and to the rotor axis and is tangent to the posts 34, though not quite touching them. The foil strip 31 is clamped firmly to the second post 37 as by means of a collar 38 mounted on the side of the post 37 remote from the rotor, and conforming to the shape of the post 37 so as to hold the foil member 31 clamped firmly between the collar and the post 37. To secure the collar 38, a clamping bolt 39 is passed through the collar 38 and through a conforming hole 41 in the foil strip 31, which hole is slightly larger in diameter than bolt 39; and the bolt is then threaded into the post 37 for tightening the collar into clamping engagement with the foil and post 37.

The third anchoring assembly 18 between which the foil end portions are passed in juxtaposed relation is different from the other two anchoring assemblies in that it has no second post 37, but instead a clamp member 42, also shown in FIG. 3. The clamp member 42 comprises a block 43 that is mounted solidly on the mounting plate 21 as by means of bolts 44 and is provided with an extension 46 presenting a flat face 47 on the radial plane of the rotor to which the third assembly posts 34 are tangent. The foil end portions 32, 33 pass across this face 47, and a separate block 48 is disposed on the other side of the foil end portions and is clamped to these portions and the face 47 as by means of a bolt 49 passing through holes 41 in the foil and threaded into the extension 46. Again the holes 41 are of substantially greater diameter than the bolt 49 so as to allow for tensioning adjustment of the foil. Since the actual movement of the rotor axis that is needed to bring it into alignment with the predetermined axis 29 is very minute the foil 31 may be manufactured in long strips with more than the required number of holes 41 all at a predetermined spacing longitudinally of the foil, and the clamping member 42 may be positioned so that the longitudinal dimension along the foil path from the position of bolt 49 to either of the bolts 39 is precisely the same as the dimension along the foil path between the two bolts 39; and as a consequence any section of foil that contains at least four of the holes 41 may be clipped off and inserted in the apparatus.

In setting up the apparatus, foil 31 is assembled in the general configuration shown, with the clamping bolts 39 tightened but bolt 49 loosened, and rotor 11 is inserted and precisely centered as by means of a gauge pin (not shown). As illustrated in FIG. 2, a thrust bearing block 51 is mounted on the lower portion of the plate 21 and has formed therein a central bore 52 that aligns with the central bore 53 of the rotor. Thus, with a snug but slidably fitted gauge pin inserted through both the bores 52, 53, the rotor can be initially positioned in precisely centered relation to the predetermined axis 29. The foil end portions 32, 33 are then tensioned as by means of weights represented by the arrows 54, and the foil is separated from the surface of the rotor 11 and from the posts 34, adjacent to the clamping member 42, by external pressurization through the interior of the rotor 11 and also through the interior of posts 34 adjacent to the clamping member 42, so that the tension equalizes in the foil segments 12, 13, 14, while the rotor axis 29 remains sensibly centered with respect to the central bore 52. The bolt 49 may then be tightened to operate the clamp 42 and preserve the correct tension established upon depressurization of the foil-rotor system.

In order to facilitate the process of the above-described adjustment, it is desirable to remove all frictional contact between the rotor 11 and the framework of the apparatus, between the rotor and the foil, and between the foil and the posts 34 of the third anchoring assembly 42. For these purposes it will be seen in FIG. 2 that the lower thrust bearing block 51 is arranged to operate as a pressurized air thrust bearing, as by the provision therein of pressurized air channels as follows. A deep circular groove 56 is formed in the bottom of the block 51 and the block is covered by a cover plate 57 containing an inlet port 58 that communicates with the groove 56. The plate 58 is secured to the block by bolts 59, and sealed to the block by means of O-rings 61 and 62. The upper portion of the block 51 is provided with a number of radially staggered upwardly directed bores 63 terminating in restrictor orifices and shallow pad recesses 64 to distribute the thrust bearing air to the lower end face of the rotor 11. An inner circular venting groove 65 is also formed in the upper face of the block 51 and communicates through radial grooves 66 with the channels 95 later to be described.

The rotor 11 is also formed to facilitate the provision of an externally pressurized air bearing between the rotor and the foil, as follows. The rotor consists of an inner core member 67 and a press fitted outer sleeve 68 in which are formed two peripheral rows of restrictor orifice bores 69 that open toward the inner face of the foil. The bores 69 communicate with two inner peripheral grooves 71, which are confronted by a pair of matching peripheral grooves 72 on the core member 67; and these last grooves communicate with the center bore 53 of the core member as by means of a number of radial bores 73. The cover plate 57 of the thrust bearing block also has an inlet port 74 communicating with the bore 52, so that upon removal of the centering pin a pressurized air source 76 can be coupled thereto to supply pressurized air to the space between the foil and the rotor whether or not the rotor is rotating. As will be seen, the orifice bores 69 can be used not only for supplying externally pressurized air to the foil bearing during tensioning of the foils, but also for supplying the foil bearing during starting and stopping of the rotor, to supplement the self-acting air bearings between the foil and rotor at low speed.

Likewise, the two posts 34 of the third anchoring assembly are provided with several rows of restrictor orifices 77 opening into the zone of foil wrap as it passes around the posts; and these orifices communicate with a center bore 78 in the post and through a communicating channel 79 in the plate 21 to provide an inlet port 81 for the supply of air from source 76 to float the foil around the surfaces of posts 34 adjacent to the clamping block 42.

It will be readily seen that when all of these pressurized air channels are coupled to the source 76, then the rotor 11 is supported for frictionless sliding on the thrust bearing block 51; and the foil 31 may be tensioned for free sliding motion around the periphery of the rotor and around the third anchoring assembly posts 34 adjacent to block 42 as well, so that there is no possibility of frictional resistance interfering with the tensioning of the foil and the pre-operation centering of the rotor.

With the use of these pressurized air channels as described, the complete centering and preload tensioning operation is as follows. The rotor 11 is centered by the gauge pin, which aligns the rotor bore 53 and the central bore 52 in the thrust bearing block 51. The foil strip is then looped around the posts in the assemblies 16, 17, with the ends of the foil strip passing between the posts 34 adjacent to the clamping block assembly 42. The slack is taken up so as to bring the foil into contact with the rotor along three circular regions of wrap, while sections of the foil tangent to the rotor 11 and the posts 34 remain plane. The foil is then clamped at assemblies 16, 17 and the tension is applied by weights attached to the free ends of the foil in the sense of the arrow 54. The centering pin is then removed and external pressurization is applied through the restrictor orifices 64, 69 and 77. The rotor is thus fully floated on air and, when the pressure is gradually reduced to zero at the rotor pressurization orifices 69 and the post pressurization orifices 77, the tension in the foil segments 12, 13, 14 is equalized and the alignment bores 52 and 53 are very nearly concentric. The deviation from concentricity is checked by the capacitance probes 28 and can easily be kept within a few ten thousandths of an inch. With tension equalization accomplished and concentricity maintained within acceptable limits, the bolt 49 is tightened, the weight 54 is removed, and the foil ends are clipped close to the outer edge of the face 47 of the clamping block assembly 42.

During operation of the turbine, the upper end of the rotor 11 is constrained by an upper thrust bearing, which is similar to the lower thrust bearing in that there is provided a block 82, a plenum chamber 83 that is closed by a screw plug member 84 and a sealing O-ring 86; and distribution and venting channels 63, 64, 65 and 66 are also provided, as well as an inlet port 58. For operating the rotor as a turbine, the two rotor end portions are provided with circumferentially spaced turbine buckets 87, and the mounting plates 21, 22 are each provided with three circumferentially equi-spaced jet nozzle bores 88 angled along chords of the rotor to direct impinging pressurized air into the buckets 87. The nozzle bores 88 are supplied from circumferential channels 89 that are closed by means of rings 91 secured to the plates 21 and 22 by bolts 92 and sealed by O-rings 93. Each of the rings 92 has an inlet port 94 communicating with the channel 89, and the pressurized air source 76 is coupled to these inlet ports 94. Air discharged from the cups 87 is exhausted through channels 95. Although in practice, the inlet ports 58, 74, 81 and 94 may all be connected to different pressurized air sources for the transmission of suitable different pressures and through conduits that are separately valved, for the sake of convenience these ports are all shown as connected to a single source 76.

During starting, stopping and at low speeds of rotation, the port 74 may be coupled to the external pressure source 76 to provide adequate separation between the rotor journal and the foil and to furnish an adequate lubricating air-film, until the speed of rotation is sufficient to establish lubrication through self-acting effects.

Referring now to FIG. 4, there is shown a variational form of the clamping arrangement for the two foil anchoring assemblies 16, 17. In this example, the foil 31 is passed in a double fashion between the same first posts 34 but is looped around a second post 96 which has a threaded bore 97 diametrically formed therethrough. In the interstice defined by the three posts, there is disposed a rounded member 98 of substantially smaller diameter than the posts, and in the bore 97 is threaded a set screw or second clamping bolt 99 bearing directly against the rounded member 98 so as to force it into additional clamping engagement with the foil and posts 34. The collar 38 is provided with a central relieved portion 100 and a clamping bolt 39 as in the version shown in FIG. 1.

FIG. 5 shows another variational form of the anchoring assemblies 16, 17 in which the second post 101 is of smaller diameter than the first posts 34, and a yoke member 102 is provided conforming to the shape of the second post 101. The yoke member 102 is secured to the posts 34 by means of a pair of clamping bolts 103 passing through the yoke member and threaded into the first posts 34 for tightening the yoke member into clamping engagement with the foil and second post 101, and for simultaneouly urging the second post 101 into clamping engagement with the foil and the first posts 34. With this arrangement, no bolt passes through the foil, and the holes 41 are not needed at either of the anchoring assemblies 16, 17.

It will be understood that many variational forms of the clamping devices and pressurization structures herein described may be devised, and that two or more foil bearing structures of the described may be used in axially spaced positions on the same rotor, each of said structures having any number of foil segments, without departing from the scope of the invention as set forth in the appended claims.

Thus there has been described a turbine driven rotor supported radially by flexible foil-bearings and constrained axially by an externally-pressurized, bidirectional thrust bearing. The foil is secured at three stations around the periphery of the journal to define three rotor-supporting foil segments. The foil is securely anchored at two stations and tension is applied to the free ends of the foil at the third station by means of weights. The foil is separated from the journal and from two foil-guides at the third staion by external pressurization, in order to eliminate friction in the process of tension equalization and rotor centering. When tension has been applied, the foil is locked at the third station. The external pressurization is also at the journal alone for augmenting the self-acting film at low rotational speeds, as during starting and stopping of the rotor.

I claim:
1. A journal bearing of the type in which a plurality of flexible foil segments are wrapped around a rotor in separate spaced sectors thereof, comprising:
- a single foil strip, of which said segments are integral parts;
- one primary and at least one secondary foil anchoring assemblies spaced around said rotor for defining the ends of and divisions between said segments;
- said foil strip being anchored to said secondary anchoring assemblies and the end portions of said foil member being passed slidably through said primary anchoring assembly; and
- means for tensioning said end portions of said foil strip whereby tension may be equalized in said segments of said foil strip and said rotor may be centered on a predetermined axis.

2. A journal bearing as in claim 1, wherein: said secondary anchoring assemblies are each equipped with means for clamping said foil thereto.

3. A journal bearing as in claim 2, wherein:
- each of said anchoring assemblies comprises a pair of rounded first posts in axial parallelism with said rotor, said posts being tangent to one another along a radial plane of said rotor, and said foil strip passing between said first posts in a doubled manner;
- said foil end portions being juxtaposed to pass in said doubled manner between said first posts comprising said third anchoring assembly;
- said secondary anchoring assemblies each having a second post in parallelism with the respective first posts thereof and lying on said respective radial plane and tangent to the respective first posts on the side thereof remote from said rotor;
- said foil, passing in said doubled manner between said first posts of each of said secondary anchoring assemblies, being looped around said respective second posts thereof;
- said clamping means being mounted on said second posts; and
- said tensioning means being applied to said foil end portions to cause the tension in said segments of said foil to equalize at a predetermined level and permit centering of said rotor.

4. A journal bearing as in claim 3 wherein said tensioning means includes:
- weight means attached to said two end portions of said foil to draw the foil to a predetermined tension;
- a clamp member for clamping said two end portions of said foil to preserve the tension established by said weight means upon equal amounts of said tension having been established in said segments of said foil.

5. A journal bearing as in claim 4, wherein:
- each of said primary anchoring assembly posts and said rotor includes means for producing an externally pressurized air bearing film beneath said foil for lubricating said foil and thus avoiding friction resistance during the process of tension equalization in said segments of said foil and of centering of said rotor;
- said externally pressurized air bearing film means for at least said rotor being also operable during starting and stopping of said rotor to supplement the self-acting films at such times.

6. A journal bearing as in claim 5, wherein said externally pressurized air bearing film means comprises:
- a plurality of orifices formed in the surface of said rotor and each of said primary anchoring assembly posts beneath said foil; and
- air pressure source means and manifold means for delivering pressurized air to said orifices.

7. A journal bearing as in claim 6, wherein:
- said rotor extending axially on both sides of said foil, and the extending portions are provided with turbine buckets, each of said extending portions being also furnished with nozzle and pressurized air means for driving said rotor as a turbine;
- said extending portions of said rotor being also provided with externally pressurized air thrust bearing means supplied by said air pressure source means.

8. A journal bearing as in claim 3, wherein each of said clamping means comprises:
- a collar mounted on the side of said second post remote from said rotor and conforming to the shape of said second post so as to hold said foil firmly clamped between said collar and said second post; and
- a clamping bolt passing through said collar and through a conforming hole in said foil and threaded into said second post for tightening said collar into clamping engagement with said foil and second post.

9. A journal bearing as in claim 9, wherein:
- a rounded member of substantially smaller diameter than that of said posts is disposed in the interstice defined by the posts of each of said secondary anchoring assemblies so as to additionally clamp said foil against said first posts thereof; and
- a second clamping bolt is threaded through said second post to engage and lock said rounded member in clamping engagement with said foil and said first posts.

10. A journal bearing as in claim 3, wherein each of said clamping means comprises:
- a yoke member mounted on the side of said second post remote from said rotor and conforming to the shape of said second post so as to hold said foil firmly clamped between said yoke member and said second post; and
- a pair of clamping bolts passing through said yoke member and threaded into said first posts for tightening said yoke member into clamping engagement with said foil and said second post, and for simultaneously urging said second post into clamping engagement with said foil and said first posts.

11. A journal bearing comprising:
- at least three flexible foil segments wrapped around corresponding circumferentially spaced sectors of said rotor, the ends of said segments being anchored to a base;
- said rotor being provided with orifice means in the plane of each of said sectors for the effusion of pressurized gas to establish externally pressurized gas bearing films between said rotor and each of said foil segments;
- said rotor also being provided with interior channel means leading from an inlet port on a surface of said rotor and communicating with said orifice means for feeding said gas to said orifice means;
- stationary manifold means positioned closely adjacent said surface of said rotor and presenting a communicating port confronting said inlet port for feeding said gas thereto while said rotor is rotating; and
- a pressurized gas source means coupled to said manifold means for supplying said gas;
- whereby the self-acting gas films that are formed between said rotor and foil segments during rotation of said rotor may be supplemented by said externally pressurized gas, particularly during starting and stopping of said rotor.

12. A journal bearing as described in claim 11, wherein:
- said foil segments and said sectors all lie in the same plane normal to the axis of said rotor;
- said orifice means comprises at least one circumferential row of angularly equi-spaced and radially directed restrictor orifice bores opening on the cylindrical surface of the rotor;
- said interior channel means comprises a central axial bore opening in one end face of said rotor to define said inlet port, and radial channel means communicating between said central axial bore and said orifice bores; and said stationary manifold means comprises a thrust bearing block closely confronting said one end face of said rotor, said block being formed with interior passages terminating in said communicating port.

13. A journal bearing as described in claim 12, wherein:
   said rotor is formed with a cylindrical inner core member containing said central axial bore and said radial channel means, and a snugly fitting exterior sleeve member containing said orifice bores; and
   said core and sleeve members are each formed with confronting peripheral grooves communicating respectively with said radial channel means and said orifice bores.

References Cited
UNITED STATES PATENTS 3,434,761   2/1969   Marley _____ 308—9

MARTIN P. SCHWADRON, Primary Examiner

F. SUSKO, Assistant Examiner